US008561024B2

(12) United States Patent
Basler et al.

(10) Patent No.: US 8,561,024 B2
(45) Date of Patent: Oct. 15, 2013

(54) DEVELOPING SOFTWARE COMPONENTS AND CAPABILITY TESTING PROCEDURES FOR TESTING CODED SOFTWARE COMPONENT

(75) Inventors: Jason Ferris Basler, Los Gatos, CA (US); James Michael Dile, San Jose, CA (US); Neeta Garimella, San Jose, CA (US); Avishai Haim Hochberg, San Jose, CA (US); Ursula Richter, San Jose, CA (US); Jean Elizabeth Vargas, Albuquerque, MN (US); Mark L. Yakushev, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 1776 days.

(21) Appl. No.: 11/626,274

(22) Filed: Jan. 23, 2007

(65) Prior Publication Data
US 2008/0178154 A1 Jul. 24, 2008

(51) Int. Cl.
G06F 9/44 (2006.01)

(52) U.S. Cl.
USPC .......................................................... 717/124

(58) Field of Classification Search
USPC ............................ 717/124–135; 714/37, 38.1
See application file for complete search history.

(56) References Cited

U.S. PATENT DOCUMENTS

| 6,031,990 | A * | 2/2000 | Sivakumar et al. ........... 717/124 |
| 6,067,639 | A | 5/2000 | Rodrigues et al. |
| 6,505,342 | B1 * | 1/2003 | Hartmann et al. ............ 717/104 |
| 7,062,753 | B1 | 6/2006 | Ward et al. |
| 7,299,451 | B2 * | 11/2007 | Dygon et al. .................. 717/124 |
| 7,313,564 | B2 * | 12/2007 | Melamed et al. ............. 717/124 |
| 7,334,219 | B2 * | 2/2008 | Cebula et al. ................. 717/124 |
| 7,478,365 | B2 * | 1/2009 | West et al. ..................... 717/124 |
| 7,581,212 | B2 * | 8/2009 | West et al. ..................... 717/136 |
| 7,873,944 | B2 * | 1/2011 | Bangel et al. ................. 717/124 |
| 2001/0052089 | A1 | 12/2001 | Gustavsson et al. |
| 2003/0046029 | A1 * | 3/2003 | Wiener et al. ................. 702/186 |
| 2003/0097650 | A1 * | 5/2003 | Bahrs et al. ................... 717/124 |
| 2004/0107415 | A1 * | 6/2004 | Melamed et al. ............. 717/124 |
| 2004/0153830 | A1 * | 8/2004 | Cebula et al. ................... 714/38 |
| 2004/0153837 | A1 | 8/2004 | Preston et al. |

(Continued)

OTHER PUBLICATIONS

Jorgensen, P.C. and Erickson, C., Object-Oriented Integration Testing, Communication of the ACM, vol. 37, No. 9 (Sep. 2004).*

(Continued)

Primary Examiner — Qing Chen
(74) Attorney, Agent, or Firm — David W. Victor; Konrad, Raynes, Davda & Victor LLP

(57) ABSTRACT

Capability test programs are generated implementing the capability test test cases for the components, wherein component developers use the capability test programs to test components during the development and coding of the components. Documentation is generated describing component abstract test cases incorporating information on capability test test cases. Component test programs are generated implementing the component abstract test cases for the components and utilizing capability test programs, wherein each component test program tests one component for at least one test case specified in the component abstract test case documentation for the component. The capability test programs and component test programs are stored in a shared repository. A software development program is deployed to enable the developers and testers to execute groups of component test programs in the shared repository to test the components during different phases of the development of the software product.

26 Claims, 4 Drawing Sheets

(56) References Cited

U.S. PATENT DOCUMENTS

| | | | |
|---|---|---|---|
| 2005/0137819 A1 | 6/2005 | Lam et al. | |
| 2005/0160322 A1* | 7/2005 | West et al. | 714/38 |
| 2005/0188271 A1* | 8/2005 | West et al. | 714/38 |
| 2006/0101397 A1* | 5/2006 | Mercer et al. | 717/120 |
| 2006/0265691 A1* | 11/2006 | Klinger et al. | 717/124 |
| 2007/0162894 A1* | 7/2007 | Noller et al. | 717/124 |
| 2007/0240116 A1* | 10/2007 | Bangel et al. | 717/124 |
| 2007/0277154 A1* | 11/2007 | Badwe | 717/124 |
| 2008/0115114 A1* | 5/2008 | Palaparthi et al. | 717/128 |

OTHER PUBLICATIONS

Williams, L. Testing Overview and Black-Box Testing Techniques (2004).*

Elbaum et al., "Test Case Prioritization: A Family of Empirical Studies," Feb. 2002, IEEE, p. 159-182.*

IBM Corp.,"Automated Test Plan Creation—a New Approach", Technical Disclosure Bulletin, Jul. 1989, pp. 399-404.

IBM Corp.,"IBM Rational Unified Process", pp. 1-14, [retrieved online Jan. 14, 2007], http://www.en.wikipedia.org/w/index.php?title=IBM_Rational_Unified_Proc . . .

Haumer, "IBM Rational Method Composer: Part 1: Key concepts", IBM Corp., Dec. 2005,pp. 1-14, [retrieved online Jan. 14, 2007], http://www-128.ibm.com/developerworks/rational/library/dec05/haumer/.

Kroll, et al., "The Rational Unified Process Made Easy: A Practioner's Guide to the RUP", Part I—Introducing the Rational Unified Process, Addison Wesley Professional, Mar. 2003, pp. 1-26.

Wikipedia, "Extreme Programming", pp. 1-9, [retrieved online Jan. 14, 2007], http://en.wikipedia.org/w/index.php? title=Extreme_Programming&print . . .

Wells, "Extreme Programming: A Gentle Approach", Feb. 2006, [retrieved online Jan. 14, 2007], http://www.extremeprogramming.org/01/14/2007.

* cited by examiner

DEVELOPING SOFTWARE COMPONENTS AND CAPABILITY TESTING PROCEDURES FOR TESTING CODED SOFTWARE COMPONENT

BACKGROUND OF THE INVENTION

1. Field of the Invention

The present invention relates to a method, system, and article of manufacture for developing software components and capability testing procedures for testing coded software component.

2. Description of the Related Art

An integrated development environment (IDE), also known as an integrated design environment and integrated debugging environment, comprises a computer program or development tool that assists computer programmers in developing software. IDEs normally consist of a source code editor, a compiler and/or interpreter, build-automation tools, and (usually) a debugger. Sometimes a version control system and various tools to simplify the construction of a GUI are integrated as well.

During program development, developers of program components, comprising the functions that perform and implement the product operations defined during a high level design phase, may develop tools and other programs to test the components they are developing. Different developers working on different components may separately develop different test programs to test their components. Component developers often develop unit tests that test their specific functions without considering the effects of their component operations on other components. For instance, in the "extreme programming" paradigm, component developers test their components while coding the component. Each component developer may create different test modules. In many situations, component developers do not leverage the testing efforts of others.

Other software development techniques include the use of unit test tools, such as Jtest®, C++ test, Ctest. (Jtest is a registered trademark of Parasoft). These unit test tools test individual routines. Traditional unit test methodology performs low level verifications of the code operations, such as interaction with memory, stack, input/output behavior, boundary condition, and exceptions. The Rational Unified Process (IRUP) is an iterative software development process providing an adaptable process framework, intended to be tailored by the development organizations and software project teams that will select the elements of the process that are appropriate for their needs. The RUP seeks to develop software iteratively, manage requirements, use component-based architecture, visually model software, verify software quality, and control changes to software.

There is a need in the art for improved techniques for developing software and capability testing procedures for testing software components and their interaction.

SUMMARY

Software components and capability testing procedures for testing coded software components are developed by generating documentation describing capability test test cases used to test components implementing operations of the software product. Capability test programs are generated implementing the capability test test cases for the components, wherein component developers use the capability test programs to test components during the development and coding of the components. Documentation is generated describing component abstract test cases incorporating information on capability test test cases. Component test programs are generated implementing the component abstract test cases for the components and utilizing capability test programs, wherein each component test program tests one component for at least one test case specified in the component abstract test case documentation for the component. The capability test programs and component test programs are stored in a shared repository accessible to multiple developers and testers of the software product. A software development program is deployed to the developers and testers developing the software product to enable the developers and testers to execute groups of component test programs in the shared repository to test the components during different phases of the development of the software product.

DETAILED DESCRIPTION

Figure 1:
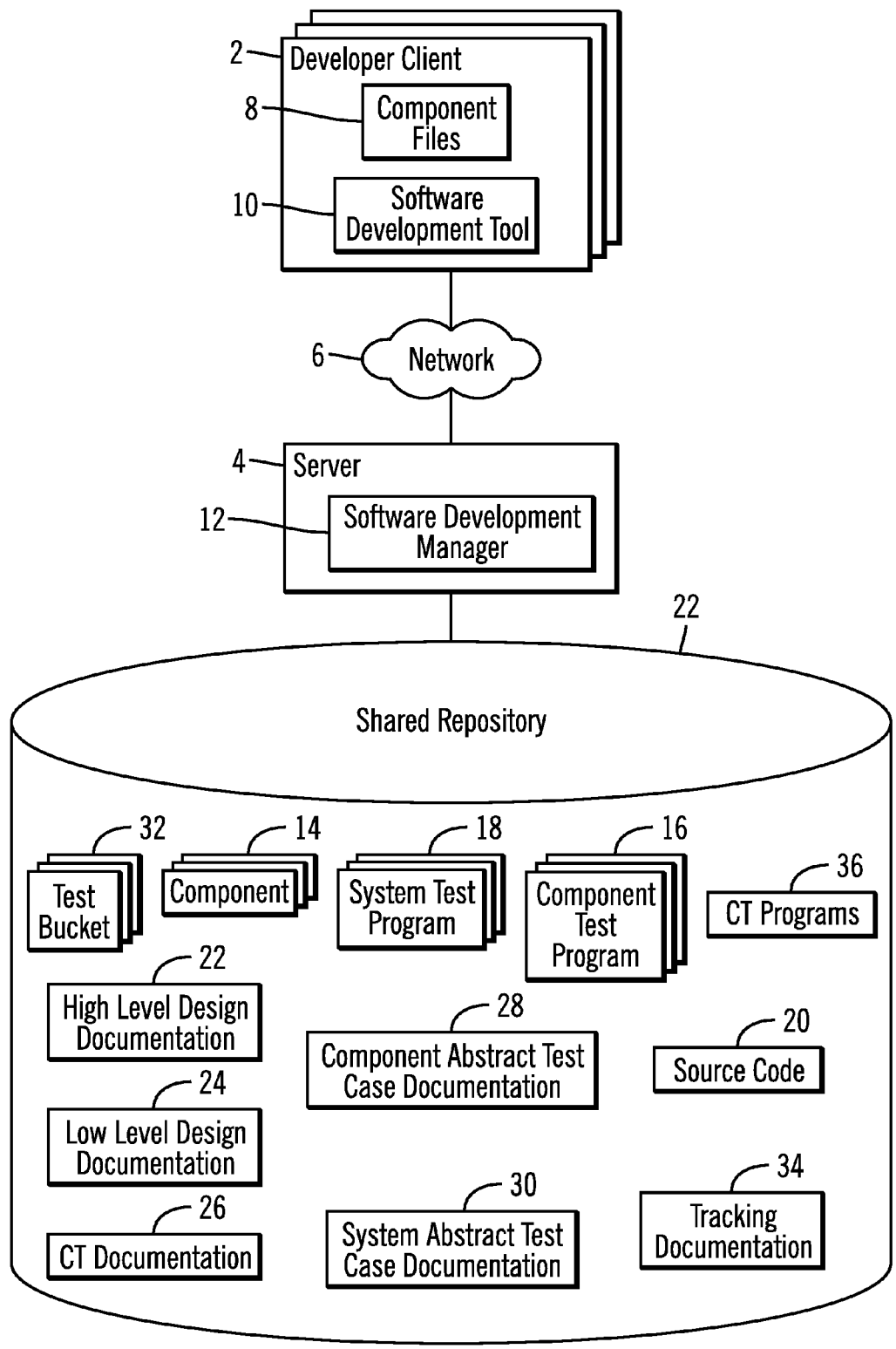
FIG. 1 illustrates an embodiment of a software development computing environment.

FIG. 1 illustrates an embodiment of a software development computing environment. One or more developer clients 2 communicate with a server 4 over a network 6. A developer client 2 includes component files 8 being developed and coded by the developer user of the developer client 2 system. A component file 8 implements one or more functions of a software product being developed. The developer client 2 further includes a software development tool 10, such as an integrated development environment (IDE) tool, also known as an integrated design environment and integrated debugging environment, which comprises a computer program or development tool that assists computer programmers in developing software. The software development tool 10 may consist of a source code editor, a compiler and/or interpreter, build-automation tools, scripting program to create test cases, and a debugger. The source code editor tool enables the developer, tester and others involved in the software product development to code the components of the software product and create test programs to test the components and the interaction of the components. The test programs may be coded as scripting programs or other types of programs known in the art.

The server 4 includes a software development manager 12 program to manage access and publication of the components 14, capability test programs 36 implementing test cases for the components 14 being developed by multiple developers using the client developer 2 systems, component test programs 16 implementing test cases for the components 14 used by testers to test the component programs 16, system test programs 18 implementing test cases testing the interaction of multiple components 14, and the source code 20 of the software product in a shared repository 22 accessible to the client developer 2 systems. The software development manager 12 may provide services to the client developer 2 systems to allow the developers to check-in and check-out components 14, test programs 36, 16 and 18, the source code 20 and to control versioning and changes. In alternative embodiments, the check-in, check-out and versioning features of the software development manager 12 may be implemented locally in the software development tools 10 of the client developer 2 systems. The test programs 16, 18, 36 may comprise script programs or other types of code to implement the test cases for components 14.

The developer clients 2 that communicate with the server 4 may comprise suitable computational devices known in the art, such as servers, desktop computers, workstations, mainframes, hand held computing devices, telephony devices, etc. The server 4 may comprise a suitable server system known in the art. The shared repository 22 may be implemented in a storage system known in the art, such as a storage system including a plurality of storage devices, e.g., interconnected hard disk drives (a Redundant Array of Independent Disks (RAID), Just a Bunch of Disks (JBOD), Direct Access Storage Device (DASD), disks connected in a loop configuration (serial loop, Fibre Channel Arbitrated Loop), a single storage device, a tape library, an optical library, a network attached storage (NAS), etc. The network 6 may comprise a Wide Area Network (WAN), Local Area Network (LAN), Storage Area Network (SAN), wireless network, the Internet, an Intranet, peer-to-peer network, etc.

Figure 2:
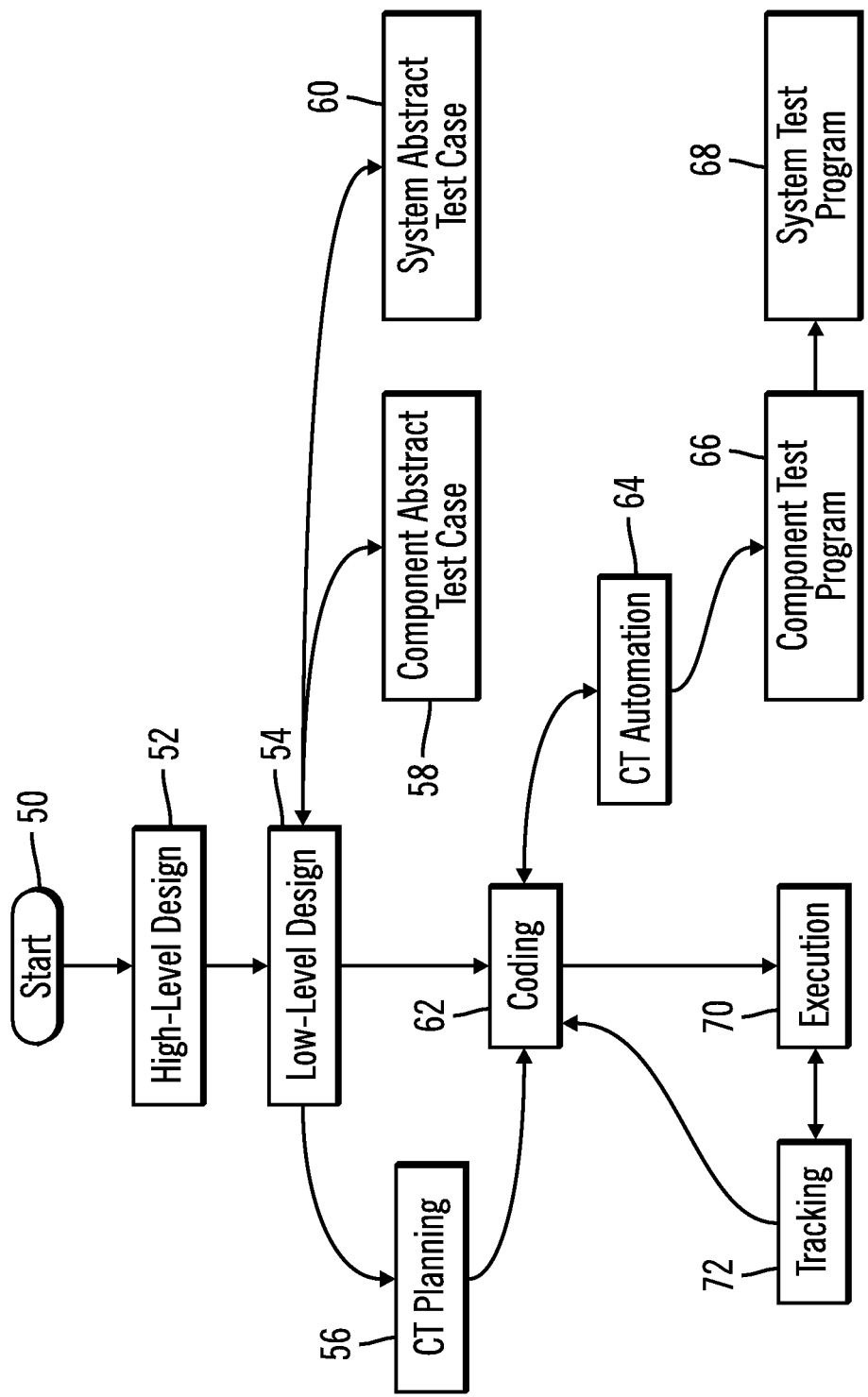
FIG. 2 illustrates an embodiment of software development phases.

FIG. 2 illustrates an embodiment of a flow of the software development process performed by multiple software developers in a distributed software development environment. At start 50, the developers, architects and others engage in the high level design 52 to determine the operations of the user interfaces (e.g., graphical user interface (GUI) panels, command line interface lines, etc), messages, etc. of the software under development. The result of the high level design 52 phase may be documented in high level design documentation 22. From the high level design phase 52, the developers proceed to the low level design phase 54 where the developers determine components (e.g., functions, subroutines, etc.) to implement the operations determined in the high level design 52 phase and write prototype code, determine algorithms and modules, etc. The results of the low level design phase 54 may be documented in low level design documentation 24. As the developers engage in the low level design 54, they may also be involved in capability test (CT) planning 56 to provide planning for the test cases that will be used to test the individual components and interactions of the components. At the capability test (CT) planning 56 phase, developers, testers and others may work together to provide up-front planning and structure to the capability testing. The results of the determined capability test planning and test case scenarios may be documented in capability test (CT) documentation 26. Further, during different phases of development, test case scenarios documented in the capability test (CT) documentation 26 may be updated to reflect changes made to components and the design.

The CT documentation 26 may specify test cases for the components identified during the low level design phase 54 and for the interaction of the components, which are documented in the low level design documentation 24. The test cases may consider different configurations under which the components may execute, such as different system settings, file system attributes, etc. The test cases may further specify test component operations under error conditions, such as invalid settings, to validate the messaging operations of the components. The test cases may further consider interactions of the components with client level, server level and other third party software. The test cases may test the user interface operations. The test cases seek to test scenarios based on developer knowledge of the inner-workings of the component code to stress critical and complex logical areas, exception handling, and special conditions. Certain of the test cases may perform exception handling by triggering conditions not expected under normal processing (e.g., session failure, unexpected response from a server or the operating system, etc.). Other test cases may test memory operations by running a leak test on the memory trace on the most frequent code paths.

The documentation 22, 24, and 26 may be provided to developers and testers to consider when coding components and test programs 16, 18, 36 during the phases 58, 60, and 56, respectively. During the component abstract test case phase 58, the testers (or developers) may create component abstract test case documentation 28 providing information on test cases that may be used to test the components. The testers determining component abstract test cases may consider test case scenarios documented in the capability test documentation 26 by the component developers. During a system abstract test case phase 60, the developers, testers, and others may create system abstract test case documentation 30 indicating different test cases for interactions of multiple components to test component integration. When testing the interaction of components, the test cases may define output from certain components that provides input to other components. In different test cases, different inputs are provided to the components to produce different outputs.

The testers determining system abstract test cases may consider test case scenarios documented in the capability test documentation 26 by the component developers and component abstract test case documentation 28. The test case documentation 26, 28 and 30 provides test case information to encourage developers, testers and others to utilize the same information, concepts and tools to facilitate consistency in their coding and testing. The documentation may be considered and reused at different phases of development, such as phases 52, 54, 56, 58, 60, 62, 64, 66, and 68. Developers may proceed to the design and planning phases, such as phases 54, 56, 58, 60, and 62 when creating new components or modifying and debugging components in order to update the information on capability and other test cases to test the new or modified components. Further, the software development tool 10 may provide access to the documentation 22, 24, 26, 28, and 30.

The test cases specified during capability test planning 56 and component 58 and system 60 abstract test case phases may specify different combinations of attributes, input and other system variables to provide to a component to test the component according to the provided values. A test case comprises a basic unit used to define a distinct set of attributes, such as environment, e.g., operating system, settings, and input values that may be provided to a component to test the operation of component using the attributes and input values defined for the test case. The system abstract test cases define different attributes and input values to provide to multiple components to test the interaction of a subset of components or all the components of the software product. The test cases may further specify expected outcomes for the different test cases.

Multiple developers and other participants in the software development process may consult the capability testing (CT) 26, component abstract test case 28, and system abstract test case 30 documentation during all phases of the development process to facilitate integration of the capability testing programs developed by the different participants in the development process. Further, when documenting the test cases, developers may decide to modify the low level design 54 documentation based on observable test results In the coding phase 62, component developers code the components 14 implementing the functions and components specified in the low level design documentation 24. During the coding 62 phase, the component developers may engage in a capability testing (CT) automation 64 phase by developing capability test (CT) programs 36, e.g., script programs, tools and other code, to test the components they are coding. Testers may participate in a component test program phase 66 and a system test program phase 68. During the component test program phase 66, component developers, testers, etc. may consult the component abstract test case documentation 28 and capability test (CT) planning documentation 26 to develop component test programs 16 to test the components for the specified component abstract test cases. Each component test program 16 may implement one or more test cases for one component 14. During the system test program phase 68, the tester, developer, etc. may consult the CT 26 and system abstract test case 30 documentation to develop and code system test programs 18 to test the interaction of multiple components for different system abstract test cases. The testers may consider and utilize the tools and scripts the developers created to test their components during the CT automation phase 64. For instance, the testers may incorporate information on the tools and scripts the developers created as part of the CT automation phase 64 to generate the component 28 and system 30 abstract test case documentation and to create the component 16 and system 18 test programs to further test the code.

At an execution phase 70, the developer or tester may use the software development tool 10 to select one or more capability test programs 36, component 16 and/or system 18 test programs to execute to test one or more of the components. In one embodiment, a plurality of test buckets 32 may be defined in the shared repository 22, where each test bucket 32 identifies a plurality of capability test programs 36, component 16 and/or system 18 test programs. The developer may use the software development tool 10 to select one of the test buckets 32 and then automatically execute all the programs 36, 16, and/or 18 defined in the test bucket 32. During the execution phase 70, the executed test programs 36, 16 and 18 may validate new functions and perform disruptive testing to identify side effects of new code on existing and previously tested components.

In a tracking phase 72, the results of executed programs 36, 16 and 18 may be displayed to the user of the software development tool 10, such as the testers or developers. Further, information on the test results may be maintained in tracking documentation 34 to enable tracking of defects discovered when executing the programs 36, 16 and/or 18. The developers may access the stored tracking documentation 34 during different phases of the development of the software product and return to the coding phase 62 and use such information to modify the component coding to correct defects. After correcting defects in the coded components 14, the developers and/or testers may rerun the programs 36, 16 and 18 to test the changed component code 14. Further, based on the tracking results, the developers and testers may return to the low level design phase 54, capability test (CT) planning 56 phase, and component 58 and system 60 abstract test case phases to modify information, test cases, etc., and update the corresponding documentation 24, 26, 28, and 30.

With the described embodiments, upon creating new components or modifying existing components, the developers, testers, etc may update the documentation 24, 26, 28, and 30 generated during the low level design phase 54, capability test (CT) planning 56, and component 58 and system 60 abstract test case phases to reflect these changes. Further, the capability test programs 36, component 16 and system 18 test programs may be modified to reflect these changes by adding or modifying the programs 16, 18, 36. These added test programs may be executed during the execution phase 70 for error tracking and debugging of the new components. The software development tool 10 enables developers and testers to perform automated and repeated execution of the test programs throughout the development and testing of the components and a test of a deliverable software product. The deliverable software product may comprise a new version of the software product, a program temporary fix (PTF) providing fixes and preventive service for an installed software product or an Authorized Program Analysis Report (APAR)/fixtest fix providing corrective service to an installed software product.

Figure 3:
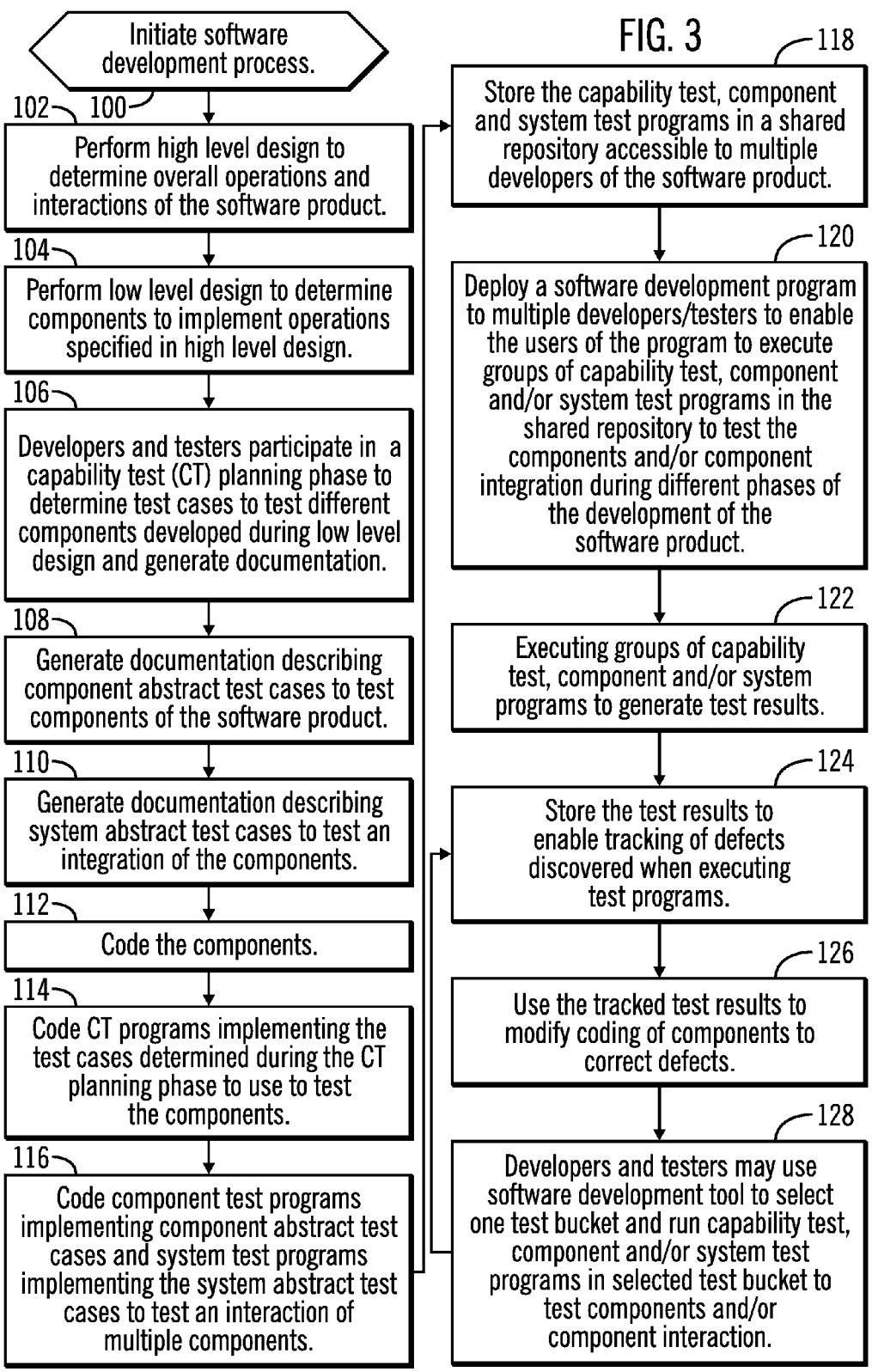
FIG. 3 illustrates an embodiment of operations performed to develop software.

FIG. 3 illustrates an embodiment of operations performed by developers, testers and others involved in the software product development process to implement the software development phases described in FIG. 2. Upon initiating (at block 100) the software development process, the developers, architecture designers, and testers may participate (at block 102) in the high level design phase 52 to determine overall operations and interactions of the software product and create high level design documentation 22. The developers may then engage (at block 104) in the low level design phase 54 to determine components to implement operations specified in the high level design and generate low level design documentation 24 providing information on the components for the software product. The developers, testers and others may participate (at block 106) in a capability test (CT) planning phase 56 to determine test cases and testing scenarios to test different components developed during low level design. Capability test documentation 26 is generated to reflect the test cases determined during the capability test phase 56. During the component 58 and system 60 abstract test case phases, the testers generate (at block 108) component abstract test case documentation 28 describing component test cases to test components of the software product and generate (at block 110) system component abstract test case documentation 30 describing system abstract test cases to test an integration of the components. As discussed, the testers may utilize test cases determined during the capability test planning phase 56 and capability test programs 36 provided by the developers.

The developers may use the low level design 24 and capability test (CT) documentation 26 to code (at block 112) the components during a coding phase 62. During a capability testing automation phase 64, the component developers or others may code (at block 114) capability test programs 36 implementing component test cases identified in the capability test planning phase 56. The testers may further code (at block 116) component test programs 16 during a component test program phase 58 and code system test programs 18 implementing the system abstract test cases as part of the system abstract test case phase 60 to test an interaction of multiple components 14. The capability test 36, component 16 and system 18 test programs are stored (at block 118) in the shared repository 22 accessible to the developer client 2 systems used by developers and testers of the software product. The documentation 22, 24, 26, 28, 30, and 34 may also be stored in the shared repository 22 to be accessible to multiple participants in the software development process.

The software development program 10 may be deployed (at block 120) to multiple developers and testers to enable the developers and testers to execute groups of capability test 36, component 16 and/or system 18 test programs in the shared repository 22 to test the components 14 and/or component 14 integration/interaction during different phases of the development of the software product. The developers and testers may use the software development program 10 to select and execute (at block 122) one or more capability test 36, component 16 and/or system 18 test programs to generate test results as part of the execution phase 70. The software development program 10 may store (at block 124) the test results in tracking documentation 34 to enable tracking of defects discovered when executing test programs 36, 16, and/or 18 as part of the tracking phase 72. Developers may use (at block 126) the tracked test results recorded in the tracking documentation 34 to modify component coding to correct defects. In an additional embodiment, developers and testers may use (at block 128) the software development tool 10 to select one test bucket 34 and run capability test 36, component 16 and/or system 18 test programs in the selected test bucket 34 to test components and/or component interaction.

Described embodiments provide software development tools and a software development process to facilitate sharing of information and shared development of capability testing test cases to test components 14 and their interaction. Described embodiments further provide a system to share capability test 36, component 16 and system 18 test programs with developers and testers to use to test the components they may be individually developing and testing. Further, the testing programs 36, 16 and 18 may be invoked and run at different phases of the software development process and test results maintained in tracking documentation 34 accessible to multiple developers and testers to use to determine whether their components need to be modified to fix any defects. With described embodiments, testing and test case information and test result information are made available to developers and testers at different levels of the coding and testing process to facilitate communication and cooperation, and the use of common information and tools for testing and coding. Still further, the software development tool may enable the automated and repeated execution of test programs throughout the development and test of the components and the software product delivery.

ADDITIONAL EMBODIMENT DETAILS

The described operations may be implemented as a method, apparatus or article of manufacture using standard programming and/or engineering techniques to produce software, firmware, hardware, or any combination thereof. The described operations may be implemented as code maintained in a "computer readable medium", where a processor may read and execute the code from the computer readable medium. A computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. The code implementing the described operations may further be implemented in hardware logic (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices. An "article of manufacture" comprises computer readable medium, hardware logic, and/or transmission signals in which code may be implemented. A device in which the code implementing the described embodiments of operations is encoded may comprise a computer readable medium or hardware logic. Of course, those skilled in the art will recognize that many modifications may be made to this configuration without departing from the scope of the present invention, and that the article of manufacture may comprise suitable information bearing medium known in the art.

The documentation 22, 24, 26, 28, 30, and 34 may be implemented in a computer readable file in the shared repository 22 accessible to developer clients 2.

Figure 4:
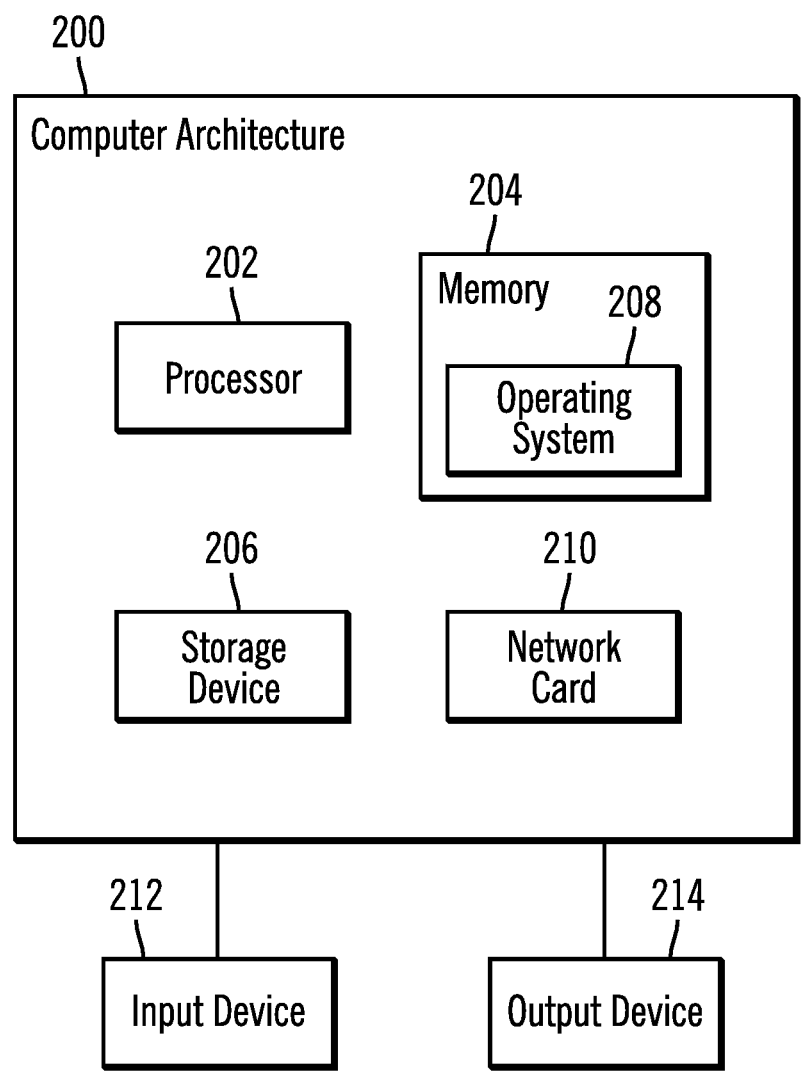
FIG. 4 illustrates an embodiment of a computer architecture that may be used with the systems in FIG. 1.

FIG. 4 illustrates one implementation of a computer architecture 200 that may be implemented at the developer clients 2 and the server 4. The architecture 200 may include a processor 202 (e.g., a microprocessor), a memory 204 (e.g., a volatile memory device), and storage 206 (e.g., a non-volatile storage, such as magnetic disk drives, optical disk drives, a tape drive, etc.). The storage 206 may comprise an internal storage device or an attached or network accessible storage. Programs, including an operating system 208, device drivers and application programs, in the storage 206 are loaded into the memory 204 and executed by the processor 202 in a manner known in the art. The architecture further includes a network card 210 to enable communication with a network. An input device 212 is used to provide user input to the processor 212, and may include a keyboard, mouse, pen-stylus, microphone, touch sensitive display screen, or any other activation or input mechanism known in the art. An output device 214 is capable of rendering information transmitted from the processor 212, or other component, such as a display monitor, printer, storage, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

The variable "n" when used to represent a variable number of an element may indicate any number of instances of the element, and may indicate different integer numbers when used with different elements.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIG. 3 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for developing a software product, comprising:
    generating documentation describing capability test cases used to test components implementing operations of the software product, wherein each component comprises a component file that implements one or more functions of the software product being tested, and wherein each capability test case defines a set of attributes, settings, and input values provided to a component to test different configurations under which the component executes;
    generating capability test programs implementing the capability test cases for the components, wherein component developers use the capability test programs to test the components during development and coding of the components;
    generating documentation describing component abstract test cases used to test the components and incorporating information on the capability test cases, wherein each component abstract test case defines a set of attributes, settings, and input values provided to a component to test different configurations under which the component executes;
    generating component test programs implementing the component abstract test cases for the components and utilizing the capability test programs, wherein each component test program implements at least one component abstract test case for one of the components to test the component for the component abstract test cases specified in the component abstract test case documentation for the component;
    storing the capability test programs and the component test programs in a shared repository accessible to multiple developers and testers of the software product; and
    deploying a software development program to the multiple developers and testers developing the software product to enable the multiple developers and testers to execute groups of the capability test programs and/or the component test programs in the shared repository to test the components during different phases of development of the software product.

2. The method of claim 1, further comprising:
    generating documentation describing system abstract test cases to test an interaction of the components in the software product incorporating information on the capability test cases, wherein in the interaction, output from certain components provides input to other components, and wherein in different system abstract test cases, different inputs are provided to the components to produce different outputs;
    generating system test programs implementing the system abstract test cases indicated in the system abstract test case documentation and utilizing the capability test programs, wherein each system test program tests an interaction of the components for at least one system abstract test case specified in the system abstract test case documentation for the interaction of the components; and
    storing the system test programs in the shared repository.

3. The method of claim 2, wherein the software development program further enables the multiple developers and testers to execute the capability test programs, the component test programs, and the system test programs in the shared repository to test the interaction of the components during different phases of development of the software product.

4. The method of claim 1, wherein the capability test cases are developed by the multiple developers and testers, and wherein the component test programs implementing the component abstract test cases are developed by the multiple testers.

5. The method of claim 1, wherein in a high level design phase, operations and interactions of the software product are specified, wherein in a low level design phase, the components needed to implement the operations and interactions specified in the high level design phase are identified, and wherein the component abstract test cases are determined for the components identified in the low level design phase.

6. The method of claim 1, further comprising:
    using, by the multiple developers or testers, the software development program to invoke automated and repeated execution of the capability test programs and the component test programs when modifying and adding components and throughout development and testing of the software product.

7. The method of claim 1, further comprising:
    executing the capability test programs and the component test programs to generate test results; and
    storing the test results to enable tracking of defects discovered when executing the capability test programs and the component test programs, wherein the stored test results are accessed by the multiple developers during different phases of development of the software product.

8. The method of claim 1, further comprising:
    storing a plurality of buckets in the shared repository, wherein the plurality of buckets define the capability test programs and/or the component test programs, and wherein the software development program further enables the multiple developers and testers to execute groups of programs by:
enabling selection of one of the plurality of buckets;
executing the capability test programs and/or the component test programs defined for the selected bucket; and
displaying information on results of the execution of the capability test programs and/or the component test programs defined for the selected bucket.

9. The method of claim 1, wherein at least one of the capability test cases for at least one of the components performs exception handling by triggering unexpected conditions under normal processing.

10. The method of claim 1, wherein at least one of the capability test cases for at least one of the components specifies test component operations under error conditions.

11. A system for developing a software product, comprising:
a plurality of developer computers used by multiple developers and testers of the software product;
a shared repository accessible to the plurality of developer computers, comprising:
documentation describing capability test cases used to test components implementing operations of the software product, wherein each component comprises a component file that implements one or more functions of the software product being tested, and wherein each capability test case defines a set of attributes, settings, and input values provided to a component to test different configurations under which the component executes; and
documentation describing component abstract test cases used to test the components and incorporating information on the capability test cases, wherein each component abstract test case defines a set of attributes, settings, and input values provided to a component to test different configurations under which the component executes; and
a software development program deployed to the plurality of developer computers to enable the multiple developers and testers of the software product to:
generate capability test programs implementing the capability test cases for the components, wherein component developers use the capability test programs to test the components during development and coding of the components;
generate component test programs implementing the component abstract test cases for the components and utilizing the capability test programs, wherein each component test program implements at least one component abstract test case for one of the components to test the component for the component abstract test cases specified in the component abstract test case documentation for the component;
store the capability test programs and the component test programs in a shared repository accessible to the multiple developers and testers of the software product; and
execute groups of the capability test programs and/or the component test programs in the shared repository to test the components during different phases of development of the software product.

12. The system of claim 11, wherein the shared repository further includes documentation describing system abstract test cases to test an interaction of the components in the software product incorporating information on the capability test cases, wherein in the interaction, output from certain components provides input to other components, and wherein in different system abstract test cases, different inputs are provided to the components to produce different outputs;
wherein the software development program further enables the multiple developers and testers of the software product to:
generate system test programs implementing the system abstract test cases indicated in the system abstract test case documentation and utilizing the capability test programs, wherein each system test program tests an interaction of the components for at least one system abstract test case specified in the system abstract test case documentation for the interaction of the components; and
store the system test programs in the shared repository.

13. The system of claim 12, wherein the software development program further enables the multiple developers and testers to execute the capability test programs, the component test programs, and the system test programs in the shared repository to test the interaction of the components during different phases of development of the software product.

14. The system of claim 11, wherein the software development program further enables the multiple developers and testers of the software product to invoke automated and repeated execution of the capability test programs and the component test programs when modifying and adding components and throughout development and testing of the software product.

15. The system of claim 11, wherein the software development program further enables the multiple developers and testers of the software product to:
execute the capability test programs and the component test programs to generate test results; and
store the test results to enable tracking of defects discovered when executing the capability test programs and the component test programs, wherein the stored test results are accessed by the multiple developers during different phases of development of the software product.

16. The system of claim 11, wherein the shared repository further includes a plurality of buckets, and wherein the plurality of buckets define the capability test programs and/or the component test programs; and
wherein the software development program further enables the multiple developers and testers to execute groups of programs by:
enabling selection of one of the plurality of buckets;
executing the capability test programs and/or the component test programs defined for the selected bucket; and
displaying information on results of the execution of the capability test programs and/or the component test programs defined for the selected bucket.

17. The system of claim 11, wherein at least one of the capability test cases for at least one of the components performs exception handling by triggering unexpected conditions under normal processing.

18. The system of claim 11, wherein at least one of the capability test cases for at least one of the components specifies test component operations under error conditions.

19. A non-transitory computer readable storage medium storing a computer executable software development program deployed to a plurality of developer computers used by multiple developers and testers developing a software product, wherein the plurality of developer computers access a shared repository and execute the computer executable software development program to perform operations comprising:

generating capability test programs implementing capability test cases for components defined in documentation in the shared repository describing capability test cases used to test the components implementing operations of the software product, wherein each component comprises a component file that implements one or more functions of the software product being tested, wherein each capability test case defines a set of attributes, settings, and input values provided to a component to test different configurations under which the component executes, and wherein component developers use the capability test programs to test the components during development and coding of the components;

generating component test programs implementing component abstract test cases for the components defined in documentation in the shared repository describing component abstract test cases used to test the components and incorporating information on capability test cases, wherein each component abstract test case defines a set of attributes, settings, and input values provided to a component to test different configurations under which the component executes, wherein the component test programs utilize the capability test programs, and wherein each component test program implements at least one component abstract test case for one of the components to test the component for the component abstract test cases specified in the component abstract test case documentation for the component;

storing the capability test programs and the component test programs in the shared repository accessible to the multiple developers and testers of the software product; and executing groups of the capability test programs and/or the component test programs in the shared repository to test the components during different phases of development of the software product.

20. The non-transitory computer readable storage medium of claim 19, wherein the shared repository further includes documentation describing system abstract test cases to test an interaction of the components in the software product incorporating information on the capability test cases, wherein in the interaction, output from certain components provides input to other components, and wherein in different system abstract test cases, different inputs are provided to the components to produce different outputs;

wherein the software development program further enables the multiple developers and testers of the software product to:

generate system test programs implementing the system abstract test cases indicated in the system abstract test case documentation and utilizing the capability test programs, wherein each system test program tests an interaction of the components for at least one system abstract test case specified in the system abstract test case documentation for the interaction of the components; and store the system test programs in the shared repository.

21. The non-transitory computer readable storage medium of claim 20, wherein the software development program further enables the multiple developers and testers to execute the capability test programs, the component test programs, and the system test programs in the shared repository to test the interaction of the components during different phases of development of the software product.

22. The non-transitory computer readable storage medium of claim 19, wherein the software development program further enables the multiple developers and testers of the software product to invoke automated and repeated execution of the capability test programs and the component test programs when modifying and adding components and throughout development and testing of the software product.

23. The non-transitory computer readable storage medium of claim 19, wherein the software development program further enables the multiple developers and testers of the software product to:

execute the capability test programs and the component test programs to generate test results; and store the test results to enable tracking of defects discovered when executing the capability test programs and the component test programs, wherein the stored test results are accessed by the multiple developers during different phases of development of the software product.

24. The non-transitory computer readable storage medium of claim 19, wherein the shared repository further includes a plurality of buckets, and wherein the plurality of buckets define the capability test programs and/or the component test programs; and wherein the software development program further enables the multiple developers and testers to execute groups of programs by:

enabling selection of one of the plurality of buckets;

executing the capability test programs and/or the component test programs defined for the selected bucket; and displaying information on results of the execution of the capability test programs and/or the component test programs defined for the selected bucket.

25. The non-transitory computer readable storage medium of claim 19, wherein at least one of the capability test cases for at least one of the components performs exception handling by triggering unexpected conditions under normal processing.

26. The non-transitory computer readable storage medium of claim 19, wherein at least one of the capability test cases for at least one of the components specifies test component operations under error conditions.

* * * * *